Oct. 23, 1928.  W. L. HANCOCK  1,688,418

SAW CARD

Filed Sept. 1, 1927

INVENTOR
William L. Hancock
By Mitchell, Chadwick & Kent,
ATTORNEYS.

Patented Oct. 23, 1928.

1,688,418

UNITED STATES PATENT OFFICE.

WILLIAM L. HANCOCK, OF DALLAS, TEXAS, ASSIGNOR TO THE MURRAY COMPANY, OF DALLAS, TEXAS, A CORPORATION OF TEXAS.

SAW CARD.

Application filed September 1, 1927. Serial No. 216,916.

My invention is a toothed card to be employed in operating upon fibrous material, such as wool, cotton, or the like for the purpose of straightening the fibres, in preparation for various operations upon it, and also in the burring or cleaning of the fibre.

Figure 1:
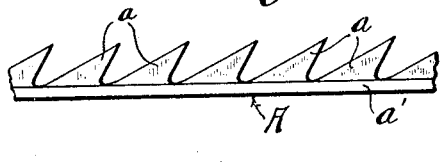
Figure 1 is a side view of a section of ribbon saw.
Figure 2:
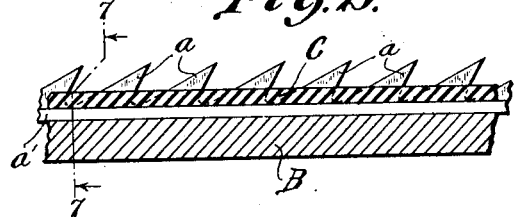
Figure 2 is a cross-section of a section of saw card.
Figure 3:
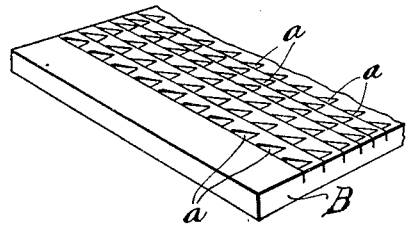
Figure 3 is a perspective view of a saw card.
Figure 4:
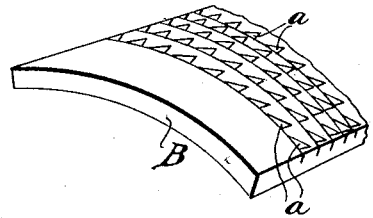
Figure 4 is a similar view of a shaped card.
Figure 5:
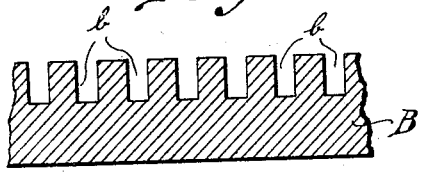
Figure 5 is a view on a larger scale of a card base before the saws are inserted.
Figure 6:
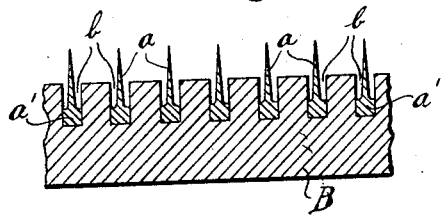
Figure 6 is a similar view after the saws are inserted.
Figure 7:
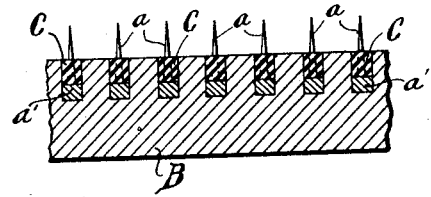
Figure 7 is a similar view after the binder has been applied.

In the drawings A is the saw ribbon, $a$, the teeth formed thereon and $a'$ the relatively wide and shallow base, its section permitting the ribbon to conform to a plane or a curved surface. B is a base, having slots $b$ to receive the base $a'$ of the saw ribbon. C is the binding agent which is applied in liquid form and fills the unoccupied parts of the slots and coats the surface between the rows of teeth, $a$, leaving the points of the teeth projecting but embedding the base $a'$ in the slot $b$ and filling between the teeth.

It has been heretofore usual to employ in carding engines rotatable metal cylinders in the face of which was cut a spiral groove to receive a flat ribbon or wire in one edge of which was cut a multiplicity of saw teeth. Such cylinders were expensive to make and expensive to repair owing to the fact that the long ribbon saw required special machinery to produce and the spiral grooving of a metal cylinder to receive the saw ribbon required repeated cuts, while the securing of the ribbon in place in the spiral groove, by rolling down the edges of the groove to grip the base of the saw ribbon was also slow, expensive and imperfect in its result. When repairs were required it was usually more economical to make a new cylinder than to attempt to remove the saw-ribbon from the cylinder and to replace it.

In my invention I employ the saw ribbon as heretofore used, but in relatively short lengths. Also I do not use cylinders having helical slots to receive and carry the saw ribbon, nor metal bases or carriers, but on the contrary my bases are of non-metallic material, as wood, hard rubber or other non-metals, which may be shaped or molded, provided with slots in parallel, suitable to receive the base of the lengths of saw ribbon. The non-metallic slotted bases may be plane or of curved shape, depending upon the desired use, whether upon a table or upon a travelling belt or upon a cylinder or drum.

Such a card as I have described and shown is cheaply made and may be easily, quickly and cheaply replaced if injured. In the making of my improved card a plate of non-metallic material, which may be plane or curved as necessary for the designed use, is treated by a gang saw to provide a multiplicity of parallel slots in the surface of the plate, deep enough to receive the base or thick edge of the saw ribbon, leaving only the points of the teeth projecting. Suitable lengths of saw are arranged in the several slots and liquid cementitious material is then applied to the slotted surface to fill the unoccupied portion of the slots and connect the saws and the plate. Varnish, to which a small portion of oil has been added to render it tough and flexible, is a suitable cement and may be economically applied by spraying, leaving only the points of the teeth above the cement material. The cards may be secured to their support, be it a table, a belt or a cylinder, by any of the ordinary means, suitable for such a purpose, as by riveting, nailing or cementing and may be multiplied to cover any desired surface on belt, drum or table. In such a card the several saw teeth are provided with a common saw base, and this saw base is again provided with a base in the slotted plate, within which the saws are seated and secured. The saw base is preferably relatively wide and the teeth are cut deeply, so that the base is relatively thin vertically, permitting the saw to be easily flexed over a curved surface. The kerf or slot in the base board is of a depth sufficient to receive the saw base and the lower part of the teeth, so that the cement when applied fills the slot at the sides of the teeth and between the teeth, leaving the points of the teeth projecting from the slot. The cement after application as described, hardens in place, serving as a nexus between the saws and the base plate.

I claim:

1. As a new article of manufacture, a saw card, comprising a non-metallic base, said base being provided on one face with a multiplicity of parallel slots; saw lengths set in said slots; a cement sheet filling the unoccupied outer part of the slots and securing the saws in the slots.

2. In a saw card, in combination, a nonmetallic saw base, having a multiplicity of parallel slots in one face; lengths of saw ribbon in the slots; a sheet of binding material over the slotted surface of the base, extending between the saw ribbons and between the teeth of the saw ribbon and connecting the ribbons and the base.

Signed at Dallas, Texas, this 26th day of August, 1927.

WILLIAM L. HANCOCK.